(12) United States Patent
Phung et al.

(10) Patent No.: US 7,388,858 B2
(45) Date of Patent: Jun. 17, 2008

(54) DISTRIBUTED ARCHITECTURE FOR A TELECOMMUNICATIONS SOFTWARE SWITCH

(75) Inventors: Van Phung, Boca Raton, FL (US); Amruth Laxman, Boca Raton, FL (US); Jack Bloch, Boca Raton, FL (US); Le Van Dinh, Boca Raton, FL (US); Karina Sicuro, Boca Raton, FL (US); Scott Knapik, Boca Raton, FL (US); Nicholas St. Cavish, Coral Springs, FL (US)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 982 days.

(21) Appl. No.: 10/109,293

(22) Filed: Mar. 28, 2002

(65) Prior Publication Data

US 2002/0196780 A1    Dec. 26, 2002

Related U.S. Application Data

(60) Provisional application No. 60/279,295, filed on Mar. 28, 2001, provisional application No. 60/279,279, filed on Mar. 28, 2001.

(51) Int. Cl.
*H04L 12/66* (2006.01)

(52) U.S. Cl. .................................... 370/352; 370/356
(58) Field of Classification Search ................ 370/384, 370/351, 352, 401, 486, 465, 466, 467
See application file for complete search history.

(56) References Cited

U.S. PATENT DOCUMENTS

| 6,614,781 | B1 * | 9/2003 | Elliott et al. ................. 370/352 |
| 2003/0076815 | A1 * | 4/2003 | Miller et al. ................. 370/352 |

* cited by examiner

*Primary Examiner*—Ajit Patel
(74) *Attorney, Agent, or Firm*—Laurence A. Greenberg; Werner H. Stemer; Ralph E. Locher

(57) ABSTRACT

A software-based telecommunications switch architecture with distributed supervision, network communications, and signal processing provides an expandable call volume handling capacity without having to add additional supervisory processing capability. The call signals are processed by a plurality of media control platforms which communicate with a supervisory network services processor and communicate with the network through a packet manager. The switch can be expanded by adding more media control platforms without the need to provide a new or additional network services processor or packet manager.

8 Claims, 5 Drawing Sheets

DISTRIBUTED ARCHITECTURE FOR A TELECOMMUNICATIONS SOFTWARE SWITCH

This application claims the benefit of priority under 35 U.S.C. 119(e) to two abandoned U.S. Patent Provisional Application Ser. Nos. 60/279,295 and 60/279,279, both filed on Mar. 28, 2001, the contents of each of said application being incorporated by reference herein.

This application is also related to the following U.S. Patent Applications: U.S. patent application Ser. No. 10/108,603 filed Mar. 28, 2002 entitled Distributed Architecture for a Telecommunications System; U.S. patent application Ser. No. 10/109,128 filed Mar. 28, 2002 entitled Method and Apparatus for a Messaging Protocol in a Distributed Telecommunications System; U.S. patent application Ser. No. 10/109,196 filed Mar. 28, 2002 entitled Method and Apparatus for Providing A Software Adaptation Layer in a Telecommunications System; U.S. patent application Ser. No. 10/115,435 filed Mar. 28, 2002 entitled Method and Apparatus for a Deriving a Standard MAC Address from A Physical Location; U.S. patent application Ser. No. 10/109,157 filed Mar. 28, 2002 entitled Method and Apparatus for A Centralized Maintenance System within a Distributed Telecommunications Architecture; and U.S. patent application Ser. No. 10/109,149 filed Mar. 28, 2002 entitled Method and Apparatus for Providing a Proprietary Data Interface in a Distributed Telecommunications System, the contents of each of said applications being incorporated by reference herein.

BACKGROUND OF THE INVENTION

In a traditional PSTN network, calls are routed through dedicated switching assemblies. To expand the capability of this system, more or larger switching assemblies are utilized. Given the rapid expansion of telecommunications, in part owing to the increase in digital and wireless traffic, the switching system has had to rapidly expand to handle the call volume.

Computer networking technology and the Internet offer two models of flexibility and scalability that the telephone industry has looked to for the future. In that regard, industry groups have established the concept of the "Softswitch," a software-based switching network. These efforts are described in part at two industry websites: the International Softswitch Consortium at www.softswitch.org and the Multiservice Switching Forum at www.msforum.org.

Notwithstanding this work, there remains a need for a switching system that may be easily scaled and can handle a variety of protocols and signalling formats (e.g., SS7, ATM, VoIP, MGCP, H.323, H.248). By breaking down the functions performed in a softswitch and distributing those functions over several computing platforms, a more flexible and scalable architecture is achieved. Further, by selectively providing different forms and levels of redundancy for the various platforms, a more reliable system can be obtained. Finally, by providing a platform that translates from one of the several external protocols to an internal, proprietary protocol, the switch can have universal application.

DESCRIPTION OF THE INVENTION

Figure 1:
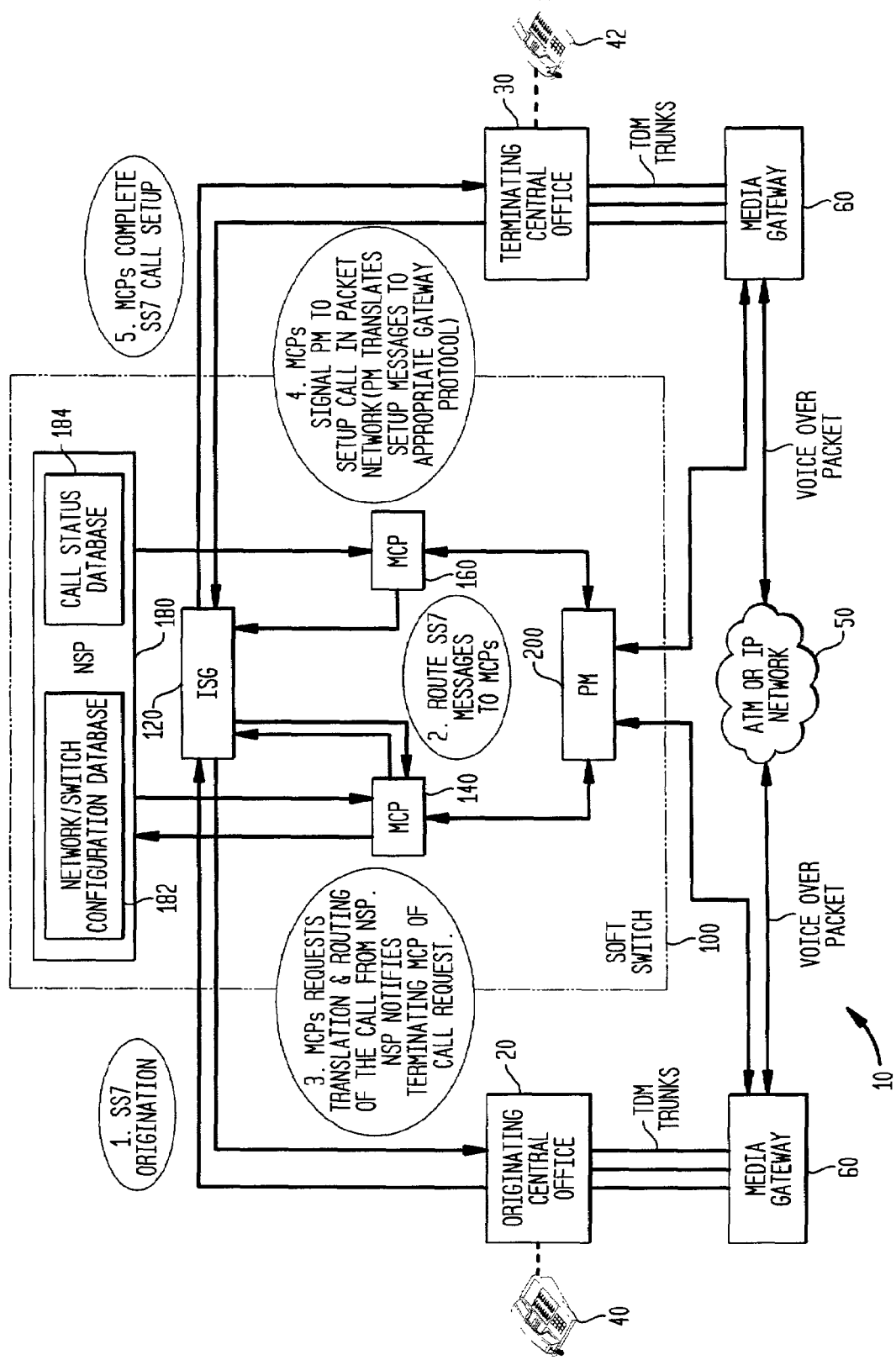
FIG. 1 is a block diagram of a telephone system incorporating a soft switch.

As shown in FIG. 1, the telephone system 10 has an originating central office 20 and a terminating central office 30 interconnecting subscribers 40 and 42. In place of a traditional switching network, there is an ATM (asynchronous transfer mode) or IP (internet protocol) network 50 (or a network employing some other transmission medium). The central offices 20 and 30 are connected to each other through the network 50 via media gateways 60 and conventional interfaces such as TDM trunks. Subscribers may also connect to the soft switch 100 directly via access devices (e.g., integrated access devices [IADs] and cable modem termination system [CMTS]) or as packet subscribers, in lieu of conventional PBX, analog, and ISDN devices.

The routing of voice and data through the network 50 is controlled by a soft switch 100 comprising one or more media control platforms (MCPs) 140, a network services processor (NSP) 180, and a packet manager (PM) 200. By establishing these various components of the soft switch 100, the work is efficiently distributed over several elements. If desired, the work could be apportioned in a different fashion, for example, subdividing the media control platforms 140 or perhaps the packet manager 200, or even combining certain of the elements. An integrated signaling gateway (ISG) 120 is also provided in the system 10 of FIG. 1 and serves as an interface between the system 10 and the soft switch 100.

When a subscriber wishes to place a call, the originating central office 20 sends a signaling message to the integrated signaling gateway 120. The message may be in any suitable format such as SS7. The integrated signaling gateway 120 distributes the message to the media control platform 140 and also forwards outgoing messages (e.g., notifications of a call) to the terminating central office 30. Additionally, the integrated signaling gateway 120 has responsibility for the integrity of the interconnections with the central offices 20 and 30. Should one of these interconnections be damaged or otherwise be unable to function, the integrated signaling gateway 120 will attempt to reestablish them and the coordination with the central offices 20 and 30.

The media control platforms 140 are responsible for controlling calls, including call setup and release. Media control platforms are logically assigned to a set of trunks, subscriber lines, or access devices, handling the originating and terminating sides of a call. Because the media control platforms each handle multiple trunks, lines or devices, perhaps 8000 apiece, it is conceivable that the originating and terminating trunks or lines could be assigned to the same media control platform. However, for clarity, a second media control platform 160 is shown in FIG. 1.

The network services processor 180 is responsible for call routing and maintains a database representative of the network. It also handles administrative, billing, call feature control, and maintenance functions, as well as overall supervision and configuration for the switch 100. With respect to configuration of the network 50 and the soft switch 100, the network services processor 180 maintains a network/switch configuration database 182 of the trunks and/or lines assigned to each of the media control platforms 140, 160. The configuration database provides the media control platforms 140, 160 and the packet manager 200 with the information necessary to route calls from the originating endpoint 40 to the terminating endpoint 42. In an actual implementation, the network/switch configuration database 182 could be subdivided into a number of databases, perhaps separating the switch configuration data from the network configuration. To maintain supervision over switching activities, the network services processor 180 further comprises a call status database 184 that holds the call states of the trunks and lines handled by the soft switch 100.

When the network services processor 180 receives a routing request from the originating media control processor 140, the network services processor 180 consults its database to determine the proper routing for the call and provides the routing information for the endpoints of the call to the media control platforms 140, 160 handling the originating and terminating sides of the call. Also, the network services processor 180 tracks the call states of the components of the soft switch 100 and the subscribers. Finally, the network services processor 180 is responsible for setting up subscriber and trunk features of the links and subscribers.

The packet manager 200 provides an Interface between the soft switch 100 and the media gateway 60 (or another access device). Externally, i.e., outside of the soft switch 100, the packet manager 200 supports the protocol employed by the network 50 (e.g., ATM, IP, SIP, MGCP, H.323, H.248). Internally, the packet manager 200 utilizes a proprietary protocol, which may include a legacy protocol ported to the environment of the soft switch 100. Except for initial configuration and maintenance issues where the packet manager 200 communicates with the network services processor 180, the packet manager 200 communicates primarily with the media control platforms 140, 160 and the media gateways 60. The media control platforms 140, 160 provide information to the packet manager 200 for connecting each side of the call through the network 50. The packet manager 200 then passes this information (i.e., "connection information") on to the media gateways 60 on the originating and terminating sides of the call.

Figure 2:
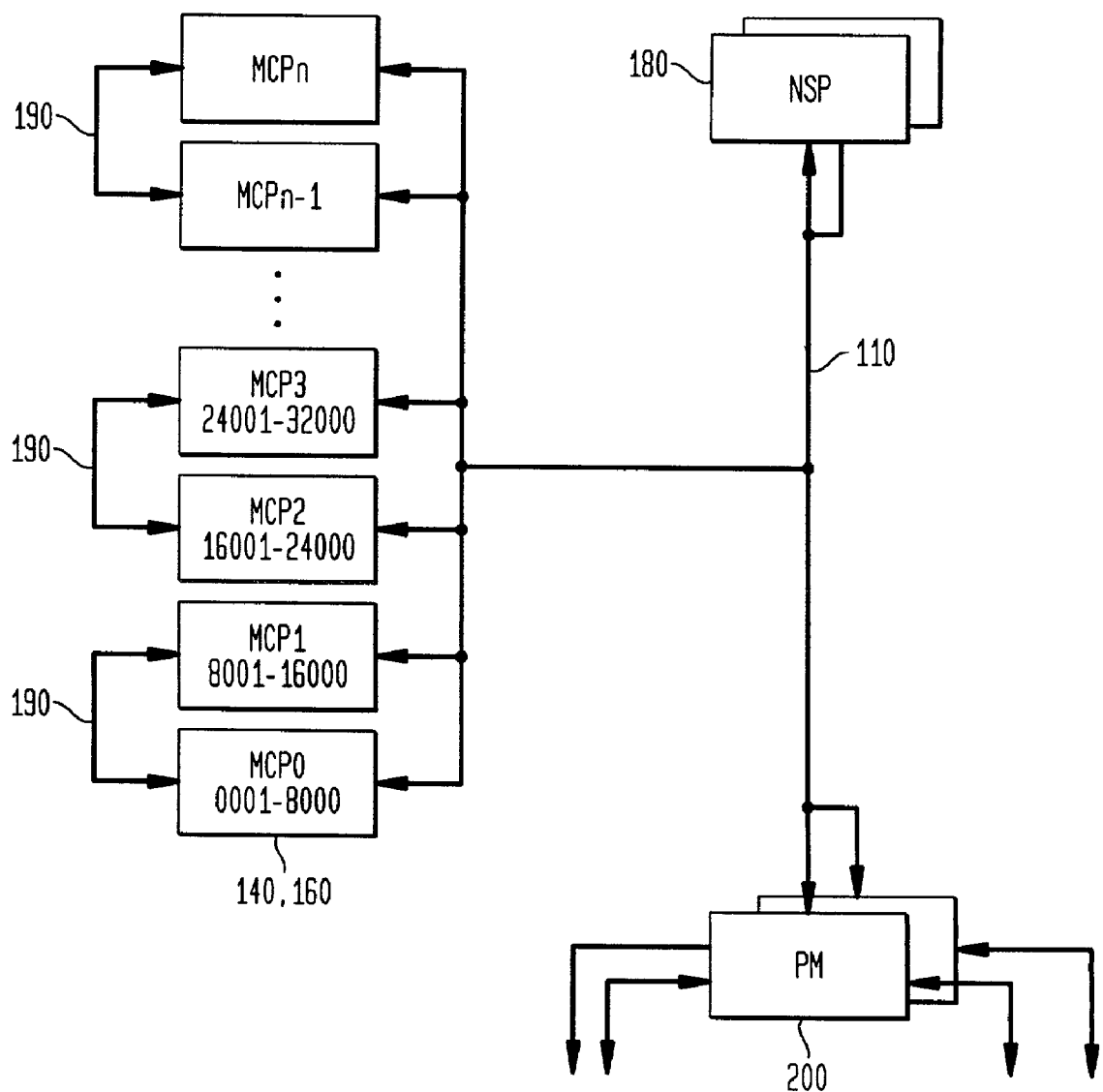
FIG. 2 is a block diagram of a portion of a soft switch illustrating the fault tolerance and scalability of the switch.

The soft switch is shown by itself in FIG. 2 (less an optional integrated signaling gateway 120). The components of the soft switch 100 communicate with each other over a local area network (LAN) 110. As can be seen from this figure, the soft switch 100 also provides for redundancy by designating multiple elements for several of the components of the soft switch 100. For example, real-time duplicates of the network services processor 180 and the packet manager 200 can be provided, with each of the pairs (i.e., the network services processors and the packet managers) operating in a microsynchronous mode and providing fault tolerant redundancy. Alternatively, either or both of the network services processor 180 and the packet manager 200 could be operated in a software redundant mode, where the load is shared between two processors and synchronization and backup is achieved through software.

The media control platforms 140, 160 can be teamed in pairs that share the load in an "active/active" mode (each media control platform being "active"). If one of the platforms fails, the other takes over. For any given pair of media control platforms, they will each be cognizant of the current status of calls the other is handling by way of a synchronization channel 190. Although the synchronization channel 190 is shown as a separate link in FIG. 2, the synchronization information would likely travel over the local area network 110, and not over a separate communications channel. Therefore, in the event one has to assume the load of the other, the transition can be effected almost immediately without having to provide call status information. The trunk assignments (0001-8000, 8001__16000, etc.) are arbitrary and may be assigned in quantities and orders suitable to the application. Conceivably, greater protection could be achieved by providing media control platforms in groups of three or more.

Additionally, the internal communications links, e.g., one or more local area networks 110, may be provided with redundancy to insure a communications path in the event one of the connections fails. During operation, each pair of links will share the traffic load. In the event of a failure or some other inability of one of the links to carry traffic, the other link of a given pair will take over the entire traffic load until the former can be repaired or replaced.

To maximize the utility of the soft switch 100, the protocols used in the switch 100 are shielded from the outside. The packet manager 200 translates external commands to a form recognized by the software utilized by the soft switch 100. This is explained in greater detail in the above-referenced U.S. patent application Ser. No. 10/109, 128, titled "Method and Apparatus for a Messaging Protocol in a Distributed Telecommunications System," filed Mar. 28, 2002, and incorporated by reference herein.

Figure 3:
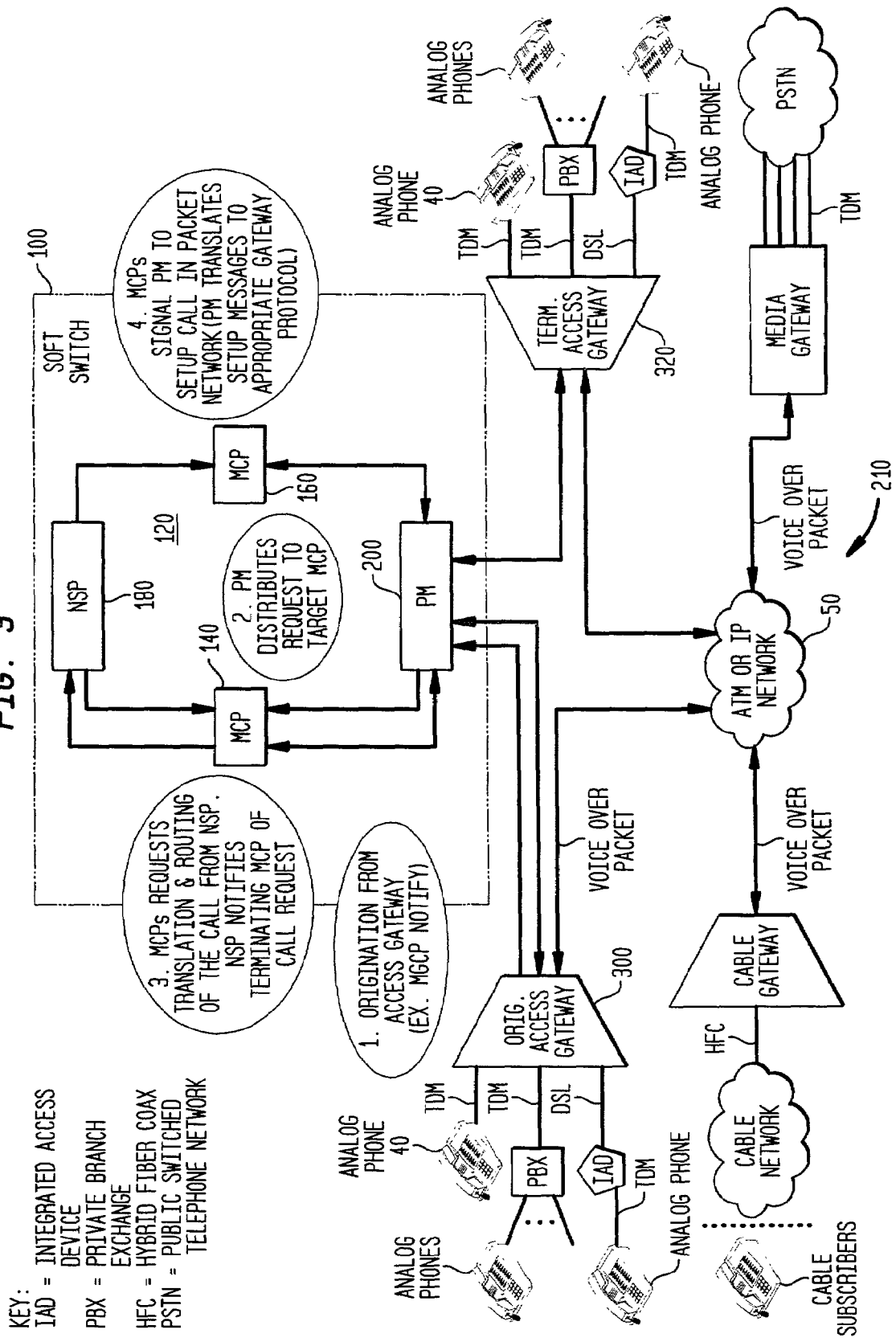
FIG. 3 is a block diagram of an alternative telephone system incorporating a soft switch.

The system 10 shown in FIG. 1 utilizes the current SS7 infrastructure. The soft switch 100 also may be used in a system that uses the Internet or some other network for signaling, as in an ATM or IP network, as illustrated by the system 210 shown in FIG. 3. Instead of sending call signaling from the central offices 20 and 30 to an integrated signaling gateway 120 (see FIG. 1), all signaling is sent over the same paths as the voice or data. Thus, the subscribers 40 and other devices ultimately reach the network 50 through originating and terminating access gateways 300 and 320. The signaling information that formerly entered through the integrated signaling gateway 120 now travels over links to the packet manager 200. Otherwise the soft switch 100 behaves in the same fashion as the system 10 of FIG. 1.

Figure 4:
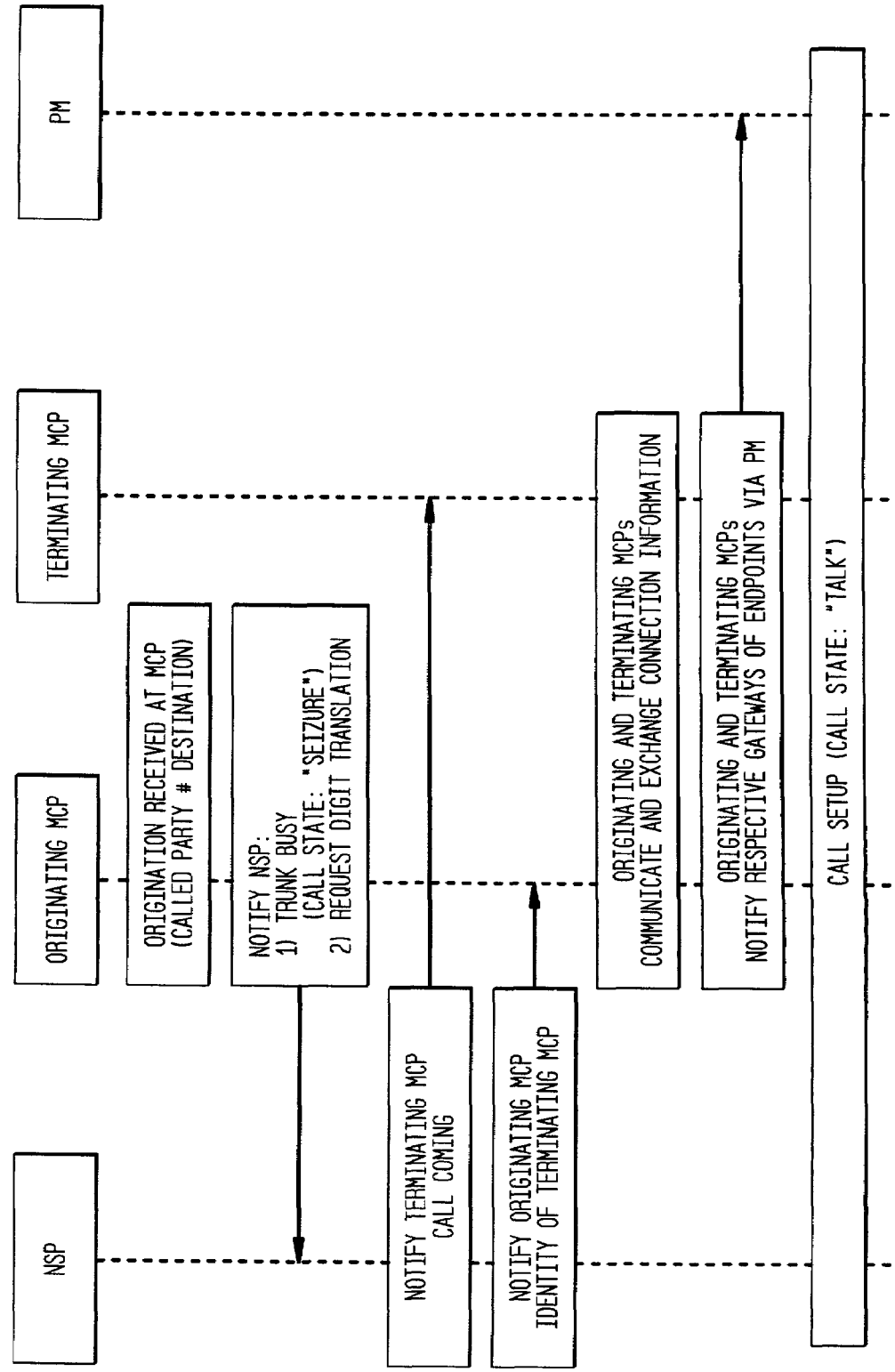
FIGS. 4 and 5 are process flow diagrams for the systems of FIGS. 1 and 3.
Figure 5:
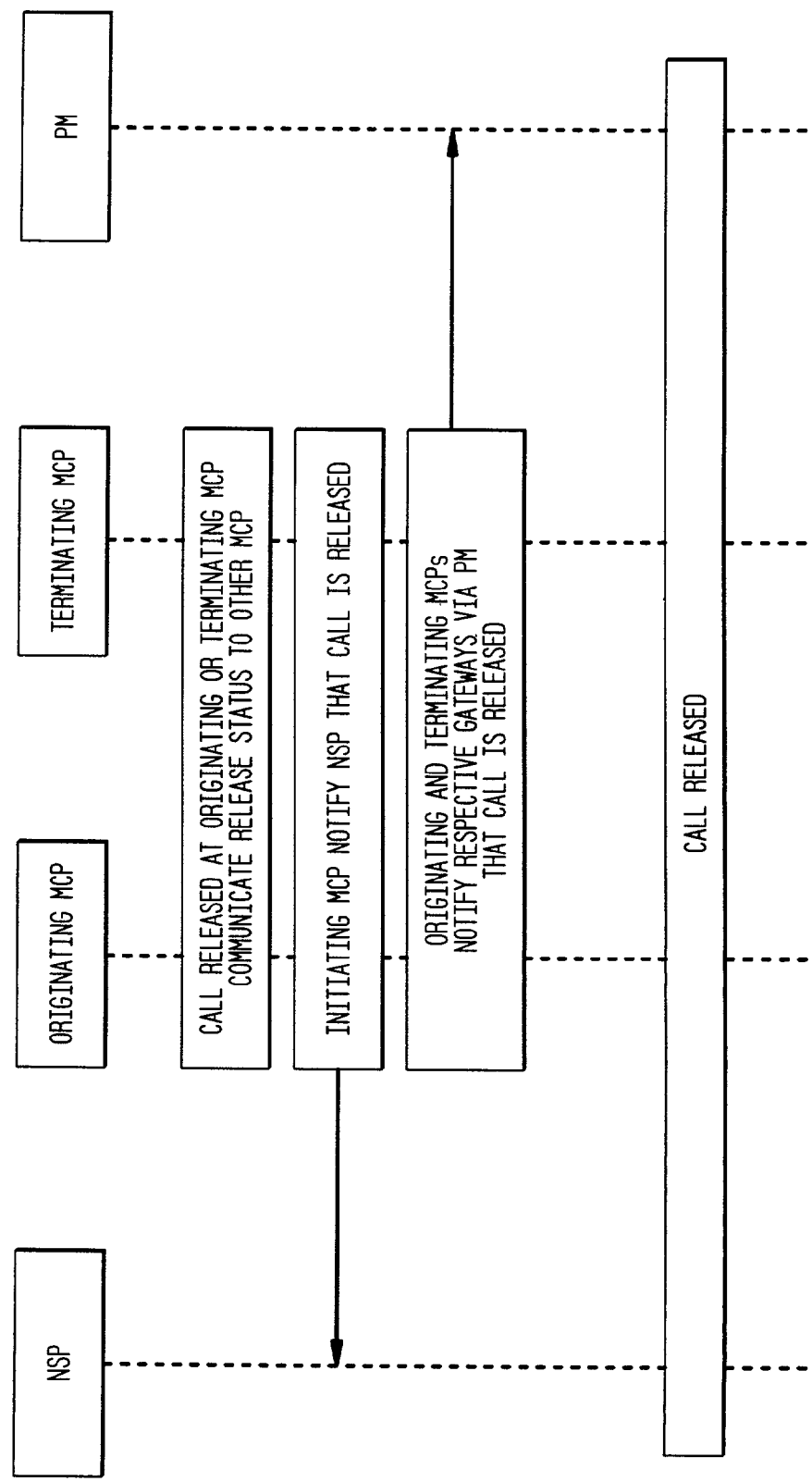

How the systems function in establishing and ending a call is illustrated in the process flow diagrams of FIGS. 4 and 5. There, the origination or call setup and the release or tear down of a call are illustrated. Further, these diagrams show how the various operations are distributed over various portions of the soft switch 100, rather than being handled by one monolithic processor.

To establish a call, beginning in FIG. 4, a subscriber (or equivalent) goes off hook (also referred to as "seizure") and an origination message is generated and ultimately received by the "originating" media control platform 140. This message includes the destination digits, i.e., the called party number. The originating media control platform 140 will then notify the network services processor 180 that a call is being requested, telling the network services processor 180 that the trunk or line is busy and request digit translation (call routing).

In turn the network services processor 180 will select an outgoing channel and notify a second media control platform 160 (the "terminating media control platform") that a call is coming and at the same time will send the identity of the terminating media control platform 160 to the originating media control platform 140. The two media control platforms 140, 160 will then communicate, exchanging information so that the respective gateways 60, 300, or 320 can set up the proper connections to the network 50. The call is then completed through the network 50, achieving call setup or call status "talk."

At some point, the call will end and the path will be released. The media control platform responsible for the first party to release the line will communicate this status change to the other media control platform and the network services processor 180. Then, the media control platforms will notify their respective gateways that the path is to be torn down. The completes the release of the path.

Scalability is achieved by providing additional media control platforms as necessary to accommodate the number of trunks or lines serviced by the soft switch 100, as shown in FIG. 2. Since the supervisory portion, i.e., the network services processor 180, can handle an increasing number of trunks and similarly the packet manager 200 is capable of coordinating the connections to the network 50, only the media control platforms need be expanded, as shown in FIG. 2. In this fashion, the soft switch 100 can be enlarged horizontally rather than adding separate, stand-alone switching systems which must be coordinated. Here, in the soft switch 100, an expandable coordination and communication capacity is provided by the network services processor 180 and the packet manager 200, respectively.

It should be understood that the division of labor set forth in FIGS. 1-6 is one of many possibilities. For example, in FIG. 2, the packet manager 200 could have been split into two parts, one part handling call signaling communications and the other handling network communication issues. Similarly, the media control platforms and the packet manager could be combined, allowing for expansion of both as the network expands. This is noteworthy in the case of FIG. 2 where the packet manager will handle an increasing load as the number of trunks served increases. Then, in the same fashion as the media control platform, the packet manager would be expanded by adding additional "packet manager processors" and the trunk load increased.

What is claimed is:

1. A software-based switching system for controlling the routing of calls through a telecommunications network, comprising:
    a network services processor, comprising means for determining call routing;
    a packet manager, where the packet manager comprises means for providing connection information to the network; and
    a pair of media control platforms, each comprising:
        means, responsive to call setup request signaling from a calling party, for providing an indication of a call setup request to the network services processor;
        means for requesting routing information from the network services processor;
        means for providing connection information to the packet manager;
        means for sharing the load;
        means for handling the load of both media control platforms; and
        a database of call states for both of the media control platforms in the pair.

2. A system as set forth in claim 1, where the means for determining call routing comprises a network and switch configuration database and the network services processor comprises means for providing information from the database to the media control platform in response to the request for routing information.

3. A system as set forth in claim 1, where the means for determining call routing comprises
    a call state database; and
    means for updating the database in response to messages from the media control platform.

4. A system as set forth in claim 1, further comprising additional media control platforms.

5. A system as set forth in claim 1, where
    the system comprises means for utilizing an internal protocol; and
    the packet manager comprises means for translating the communications to and from the network to the internal protocol.

6. A system as set forth in claim 1, further comprising a local area network interconnecting the network services processor, the packet manager, and the media control platform.

7. A software-based switching system for controlling the routing of calls through a telecommunications network, comprising:
    a network services processor, comprising means for determining call routing;
    a packet manager, where the packet manager comprises means for providing connection information to the network; and
    a pair of media control platforms, each comprising:
        means for providing an indication of a call setup request to the network services processor;
        means for providing connection information to the packet manager;
        means for sharing the load;
        means for handling the load of both media control platforms; and
        a database of call states for both of the media control platforms in the pair.

8. A method for controlling the routing of calls through a telecommunications network with a software-based switching system comprising a network services processor, a packet manager, and at least a pair of media control platforms, comprising:
    in response to call setup request signaling from a calling party, providing an indication of a call setup request received at a media control platform to the network services processor;
    sending a request from the media control platform for routing information to the network services processor;
    forwarding connection information from the media control platform to the packet manager;
    forwarding the connection information from the packet manager to the network;
    sharing a load between the media control platforms; and
    handling the load of both media control platforms in one of the media control platforms of the pair if the other media control platform fails; and
    storing call states of both media control platforms in a database of call states.

* * * * *